June 17, 1952     R. W. HAGEDORN     2,600,642
TRACTOR-IMPLEMENT HITCH

Filed Nov. 21, 1949     2 SHEETS—SHEET 1

INVENTOR.
ROY W. HAGEDORN
BY WHITEHEAD & VOGL
PER *Earle Whitehead*
ATTORNEYS

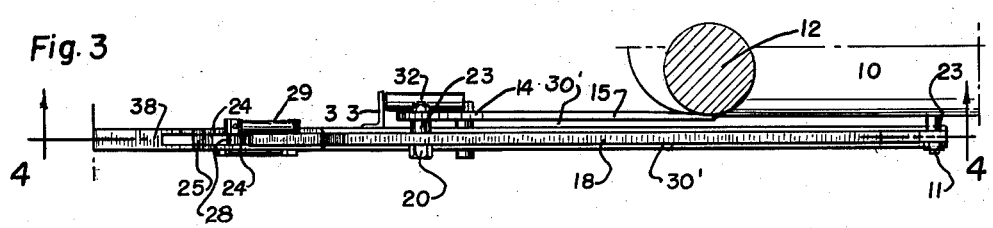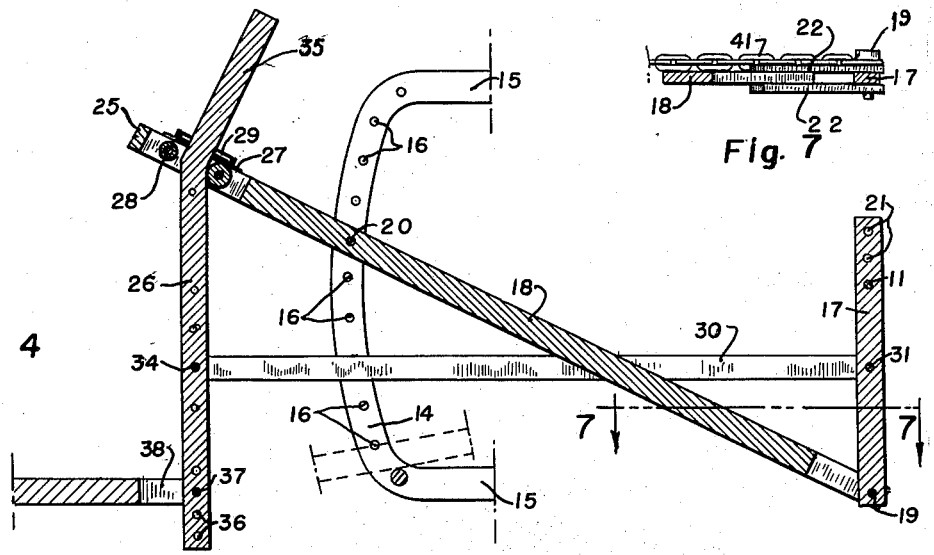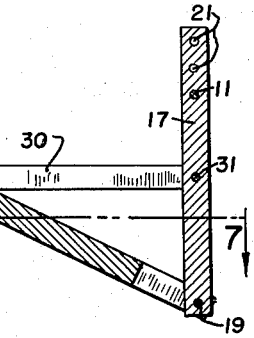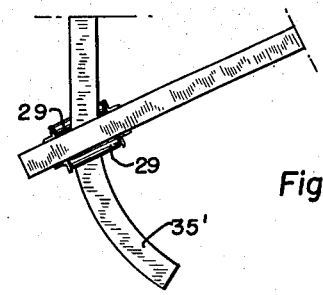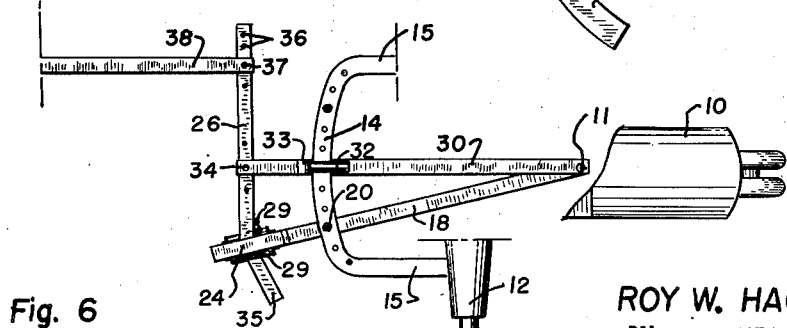

Patented June 17, 1952

2,600,642

UNITED STATES PATENT OFFICE 2,600,642

TRACTOR-IMPLEMENT HITCH

Roy W. Hagedorn, Denver, Colo.

Application November 21, 1949, Serial No. 128,669

8 Claims. (Cl. 280—33.44)

This invention relates to tractor hitches and more particularly to a hitch attachment for implements such as a one-way plow, and has as an object to provide new and improved means for holding the plow in a laterally offset position with respect to the longitudinal axis of the tractor, herein referred to as the tractor axis, to keep the tractor in proper alignment and to counteract the drag set up by the plow which has a tendency to swing the tractor out of line.

Another object of this invention is to provide new and novel means for permitting the hitch elements and the plow to swing out of alignment from the tractor axis as the tractor turns a curve, thereby eliminating severe lateral pressures upon the plow and upon the front wheels of the tractor, such as occur in conventional types of offset hitches which are rigidly secured to the tractor.

Another object of this invention is to provide an improved offset plow hitch which permits the plow and attaching elements to swing out of alignment from the tractor axis as the tractor turns a curve and to better follow the curve of the tractor, thereby greatly facilitating plowing operations at the corners of a field, and contour plowing operations in irregular fields.

Another object of this invention is to provide an improved offset plow hitch which permits the plow and attaching elements to swing out of alignment from the tractor axis as the tractor turns a curve, but which automatically returns the plow to initial offset alignment as the tractor completes the curve and commences a straight pull, thereby eliminating the necessity of various adjustments of holding and releasing as is now commonly necessary for turning a curve with conventional fixed types of offset hitches.

Yet a further object of this invention is to provide a new and improved hitch attachment which may be easily connected to various conventional tractors, which is adjustable for many uses and plow arrangements, which is sturdy, economical of construction and durable over a long period of use.

With the foregoing and other objects in view, all of which shall more fully hereinafter appear, the invention comprises certain novel constructions, arrangements and combinations of parts as shall now be described and defined in the appended claims and illustrated, in preferred embodiment, in the accompanying drawings in which:

Figure 3 is a side elevation of the improved hitch attachment as viewed from the arrow 3 of Fig. 2.

Figure 4 is a section as taken on the indicated line 4—4 of Fig. 3.

Figure 5 is a fragmentary detail of the elements shown at Fig. 2, but modified to illustrate an alternate construction thereof.

Figure 6 is a fragmentary plan view, similar to Fig. 1, but illustrating an alternate embodiment of the invention attached to a tractor.

Figure 7 is a fragmentary section as taken on the indicated line 7—7 of Fig. 4.

Figure 1:
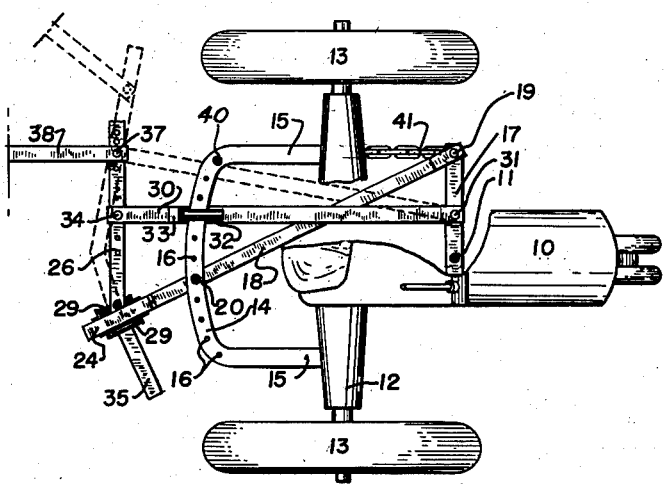
Figure 1 is a plan view of an embodiment of the invention as attached to a tractor, with portions of the tractor broken away to show otherwise hidden elements of the invention, and with dotted lines indicating alternative positions of the movable elements of the improved hitch attachment.

For field plowing, a tractor 10 is conventionally provided with a hitch pin 11 centrally positioned underneath and forwardly of the axle housing 12 of the rear driving wheels 13 of the tractor, and a rack 14 positioned in corresponding elevation with the pin 11 and transversely of the tractor axis and rearwardly of the housing 12, and attached to the said housing by connecting arms 15 at each side of the rack. This rack 14 is provided with a row of orifices 16 for the attachment of implement drawbars in various positions, and is conveniently arcuate about the hitch pin 11, as illustrated.

In the use of one-way plows, and other such implements which operate most efficiently when they are offset laterally from the tractor axis, a hitch attachment is conventionally provided which comprises a bar fixed to the hitch pin 11 and to the rack 14 at an angle with the tractor axis to offset the trailing end of the said bar where the implement drawbar connection is made. The present invention provides means to accomplish the same result; but, in addition, includes means to permit the hitch connection to swing to a further lateral offset position as the tractor and its implement turns a curve, and also means to forcibly return the hitch attachment to its normal offset position upon completing a curve and to there releasably hold it.

In my improved attachment a fixed, horizontally-disposed frame is formed by an offset bar 17, connected to the hitch pin 11 of the tractor and extending laterally therefrom, and by a support bar 18, connected to the extended end of the offset bar 17 by a pin 19 and extending rearwardly therefrom, obliquely traversing the tractor axis, and connected to the rack 14 by a bolt 20 in a selected orifice 16. Adjustments of this frame are possible through the use of various orifices 21 in the offset bar 17 which selectively engage the hitch pin 11, and by the orifices 16 in the rack 14. The support bar 18 is ordinarily in compression, and to symmetrically balance the reactions against the pin 19 to avoid buckling of the bar 18, a U-type connection is provided by lugs 22 at the end of the bar 18, between which the offset bar 17 is placed, as clearly shown in Fig. 7. This fixed frame must be positioned below the tractor 10 and the rack 14 to provide operative clearances for elements hereinafter described and, therefore, spacers 23 are provided which may be placed about the hitch pin 11 and the bolt 20 between the respective elements.

The trailing end of the support bar 18 extends beyond the connection at the rack 14, and is terminated by caps 24 attached to the top and bottom of the said support bar with the end suitably closed by a stop 25, the caps 24 and stop 25 providing a passage for a horizontally disposed floating connector bar 26 which will be hereinafter described in detail. Guide rollers 27 and 28 are positioned in this passage between the caps 24, with the floating connector bar 26 being between said rollers which position the connector bar 26 laterally and also minimize the frictional drag. Clearance rollers 29 are also provided at the edges of the caps 24 to hold the connector bar 26 in centered position with respect to the said passage and to eliminate frictional drag of the connector bar against the caps.

Attached to the fixed horizontally-disposed frame are movable elements which include the connector bar 26 and a drawbar 30. This drawbar suitably includes a duplicate bar 30' and both are pivotally connected to the offset bar 17 by a pin 31, positioned between the hitch pin 11 and the pin 19, with the bar 30 being on top of the offset bar 17 and the bar 30' being underneath to provide symmetrically balanced reactions on the offset bar 17. This drawbar extends rearwardly in approximate parallelism with the tractor axis and the respective elements 30 and 30' straddle the support bar 18 at the crossing thereof. A roller 32 is attached to the top member by a clip 33, being suitably positioned to rest upon the rack 14 to provide altitudinal support for the drawbar as it rotates about the pin 31. The length of this roller 32 may be conveniently greater than the width of the said rack to provide continuous contact regardless of the configuration of the said rack.

The rearward end of the drawbar is connected to the floating connector bar 26 by a pin 34, the respective elements 30 and 30' straddling the connector bar 26 to provide symmetrically balanced reactions at the said connection. The floating connector bar 26 is normally in transverse relation with the longitudinal tractor axis with the pin 34 near the center. The end of the connector bar which is threaded through the passage formed by the caps 24 terminates in a horizontally disposed offset arm 35 inclined towards the tractor. The other end of the connector bar is provided with a plurality of holes 36 through which a pin 37 may be used to selectively connect an implement drawbar 38 in desired offset relationship.

Figure 2:
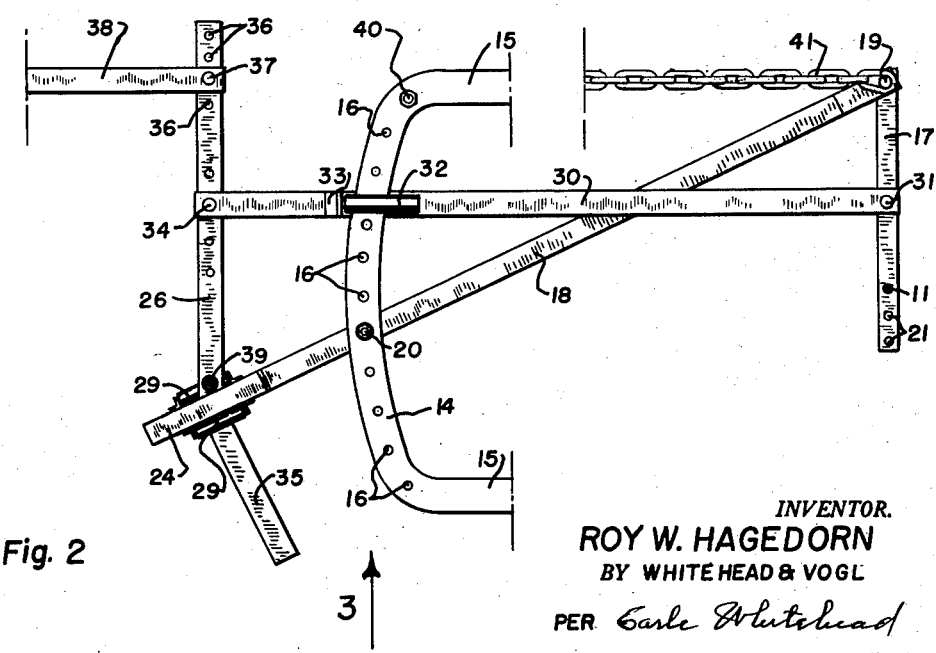
Figure 2 is a plan view of the improved hitch attachment illustrated at Fig. 1, but on an enlarged scale, with portions of the tractor hitch element illustrated to better show the method of use.

In operation and use of the improved hitch attachment a pull of the implement drawbar 38 will cause the connector bar 26 to act as a lever, providing a pull on the drawbar 30 and a compressive thrust against the support bar 18. It follows that the guide roller 27, which withstands the thrust by the connector bar 26, must be suitably designed to withstand such forces as will occur. Since the drawbar 30 is rotatable about pin 31, and the connector bar 26 is movable therewith, it follows that an unbalanced pull of the implement drawbar 38, such as occurs when the tractor turns a curve or when an obstruction interrupts the path of the implement, will cause rotation of the drawbar 30 and translation of the connector bar 26 to change the offset position of the implement drawbar 38 with respect to the tractor axis. It has been found undesirable to permit the drawbar 30 to rotate towards the tractor axis, and to move the implement drawbar 38 from its offset position towards the tractor axis, and such movement is prevented by a stop 39 (Fig. 2) on the connector bar 26 which bears against a cap 24. Such an unbalanced pull, which would move the implement drawbar 38 towards the tractor axis, would occur when the tractor is turning a curve in which the offset hitch connection is at the outside of the curve.

In ordinary use the tractor will not be turned in this direction but, if desired, the entire hitch may be reversed.

The anticipated use of the improved hitch attachment is when the tractor turns such a curve that the offset hitch connection is inside the curve, that is, the axis of the curve is on the same side of the tractor as the offset hitch connection. As the tractor turns such inside curve, the implement drawbar 38 is pulled towards the center of the curve, thereby pulling the connector bar 26 laterally and rotating the drawbar 30 to further offset the implement drawbar connection as illustrated in dotted lines in Fig. 1. This lateral offset movement is suitably limited by a stop 40 in an orifice 16 of the rack 14. In such lateral offsetting movement the arm 35 moves into the passage between the caps 24 and has no particular function during the turning of a curve. However, as the tractor completes its curve and commences a straight pull, the arm 35 exerts a thrust against the guide roller 27 and, because of the inclination of the arm, it exerts a transverse component tending to return the connector to normal position.

While the structure described will not be distorted by any normal uses, it may be desirable to provide a safety chain 41 attached between the pin 19 and the housing 12 of the tractor to prevent distortion by abnormal uses such, for example, as inadvertent reversal of the tractor.

The offset arm 35, as illustrated in Figs. 1 through 4 and Fig. 6, is a straight section as would be formed by bending the connector bar 26, but it may be curved, as illustrated in Fig. 5, the curved bar 35' providing a variable transverse return force increasing in direct proportion to the degree of offset from the normal position of the elements.

An alternate embodiment of the improved hitch assembly is illustrated in Fig. 6. This embodiment employs substantially the same elements as hereinbefore described except the offset bar 17 is eliminated, and the support bar 18 and the drawbar 30 are mutually connected to the hitch pin 11. While this alternate embodiment involves a simplification of elements, it necessitates a greater leverage on the connector bar 26 and requires heavier construction of the members 18, 26, and 30.

I have illustrated and described many details of construction but other equivalent and alternative structures, functioning similarly in principle and within the scope and spirit of the foregoing description and of the appended claims will occur to those skilled in the art; therefore, I am not to be restricted in my protection to the details illustrated and described.

I claim:

1. The combination comprising a tractor having a hitch pin, a drawbar pivotally connected to said pin and extending rearwardly therefrom, a connector bar pivotally connected to the rear portion of the drawbar, means for holding the connector bar transversely of the longitudinal tractor axis whereby rotation of the drawbar on its pivot imparts lateral translatory movement to the connector bar, means for attaching an implement hitch at one end of the connector bar in selective lateral offset position relative to the longitudinal tractor axis, means to permit the drawbar and connector bar to swing laterally responsive to divergence of tractor movement from the rectilinear, and means to return the drawbar and connector bar to initial offset position responsive to resumption of rectilinear tractor movement.

2. The combination comprising a tractor having a hitch pin and a rack transversely positioned rearwardly of the pin, a support bar fixedly attached to the hitch pin and to the rack, a drawbar pivotally connected to said pin and extending rearwardly therefrom, a connector bar pivotally connected to the rear portion of the drawbar, a guide carried at the rearward end of said support bar, engaging and permitting longitudinal sliding therepast of the connector bar but limiting lateral movement of connector bar and holding it transverse to the longitudinal tractor axis whereby rotation of the drawbar about the hitch pin imparts lateral translatory movement to the connector bar, means for attaching an implement hitch at one end of the connector bar in selective lateral offset position with the longitudinal tractor axis, means to permit the drawbar and connector bar to swing laterally as the tractor deviates from a rectilinear course whereby the implement hitch is further offset and means to return the drawbar and connector bar to initial offset position as the tractor resumes a rectilinear course.

3. The combination comprising a tractor having a hitch pin centrally positioned below and forwardly of the rear axle, a rack transversely positioned below and rearwardly of the rear axle, a support structure fixedly attached to the hitch pin and to the rack, a drawbar pivotally connected to the support structure adjacent said hitch pin, and extending rearwardly therefrom, a connector bar pivotally connected to the rear portion of the drawbar, a guide carried at the rearward end of said support bar, engaging and permitting longitudinal sliding therepast of the connector bar but limiting lateral movement of the connector bar and holding it transverse to the longitudinal tractor axis whereby rotation of the drawbar about the hitch pin imparts lateral translatory movement to the connector bar, means for attaching an implement hitch at one end of the connector bar in selective lateral offset position with the longitudinal tractor axis, means to permit the drawbar and connector bar to swing laterally as the tractor deviates from a rectilinear course whereby the implement hitch is further offset and means to return the drawbar and connector bar to initial offset position as the tractor resumes a rectilinear course.

4. The combination comprising a tractor having a hitch pin centrally positioned below and forwardly of the rear axle, a rack transversely positioned below and rearwardly of the rear axle, a frame rigidly fixed to the tractor comprising an offset bar connected to the hitch pin and extending laterally therefrom and a support bar connected to the extended end of the offset bar and extending rearwardly therefrom and obliquely traversing the longitudinal tractor axis, and connected to the rack, a drawbar pivotally connected to the offset bar in offset relation to the longitudinal tractor axis, extending rearwardly, a connector bar pivotally connected to the rear portion of the drawbar, a guide carried at the rearward end of said support bar, engaging and permitting longitudinal sliding therepast of the connector bar but limiting lateral movement of the connector bar and holding it transverse to the longitudinal tractor axis whereby rotation of the drawbar about the hitch pin imparts lateral translatory movement to the connector bar, means for attaching an implement hitch at one end of the connector bar in selective lateral offset position with the longitudinal tractor axis, means to permit the drawbar and connector bar to swing laterally as the tractor deviates from a rectilinear course whereby the implement hitch is further offset and means to return the drawbar and connector bar to initial offset position as the tractor resumes a rectilinear course.

5. The combination comprising a tractor having a hitch pin centrally positioned below and forwardly of the rear axle, a rack transversely positioned below and rearwardly of the rear axle, a support structure fixedly attached to the hitch pin and extending rearwardly therefrom, a drawbar pivotally connected to the support structure laterally of the hitch pin, a connector bar, the rearward end of the drawbar being pivotally connected to a connector bar, guide means carried by the support structure adapted to hold the connector bar transverse to the longitudinal tractor axis by holding one end of the connector bar, said end being longitudinally slidable in said guide means but held thereby against substantial movement laterally, whereby rotation of the drawbar imparts lateral translatory movement to the connector bar, means at the other end of the connector bar for attaching an implement hitch in selective lateral offset position from the longitudinal tractor axis, the end portion of the connector bar normally beyond said guide means diverging from the longitudinal axis of the connector bar and being adapted to enter said guide means as the drawbar and connector bar swing laterally, whereby to further offset the implement hitch when the tractor deviates from a rectilinear course and to return the drawbar and connector bar to initial offset position when the tractor resumes a rectilinear course.

6. In the apparatus as defined in claim 5, the additional elements comprising stops, whereby the movements of the said drawbar and connector bar are restricted to selective limitations.

7. In a tractor having a hitch pin, a drawbar pivotally connected to said hitch pin, a connector bar pivotally connected to the drawbar and carrying an implement hitch in selective lateral offset position from the drawbar when the connector bar is held transversely to the tractor axis, means for holding the connector bar transversely to the tractor axis, and means for permitting the drawbar to swing and thereby shift the connector bar laterally and further offset the implement hitch as the tractor deviates from a rectilinear course.

8. A tractor implement hitch comprising a support structure affixed to the tractor and carrying a pivot at its forward end and guide means at its rearward end, a drawbar pivotally connected to the pivot and extended rearwardly therefrom, a transversely disposed connector bar pivotally connected to the rear end of the drawbar and having one of its ends slidably carried in said guide means whereby said connector bar is transversely shiftable by swinging of the drawbar, means for attaching an implement hitch on the other end of the connector bar in a position laterally offset from the connection of the connector bar to the drawbar, and an arm carried by the guided end of the connector bar diverging from the longitudinal tractor axis at a point normally beyond said guide means, but adapted to enter the guide means as the connector bar shifts laterally.

ROY W. HAGEDORN.

REFERENCES CITED

The following references are of record in the file of this patent:

UNITED STATES PATENTS

| Number | Name | Date |
| --- | --- | --- |
| 1,604,623 | Whidden | Oct. 26, 1926 |
| 1,840,754 | Tichota | Jan. 12, 1932 |
| 1,843,381 | Brainard | Feb. 2, 1932 |
| 2,512,097 | Goodspeed | June 20, 1950 |